(12) United States Patent
Wassersug et al.

(10) Patent No.: US 12,346,969 B2
(45) Date of Patent: *Jul. 1, 2025

(54) SYSTEMS AND METHODS TO IMPLEMENT AN EXCHANGE MESSAGING POLICY

(71) Applicant: Intercontinental Exchange Holdings, Inc., Atlanta, GA (US)

(72) Inventors: Mark Wassersug, Atlanta, GA (US); Charles Vice, Roswell, GA (US); Mayur Kapani, Marietta, GA (US)

(73) Assignee: Intercontinental Exchange Holdings, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/934,310

(22) Filed: Nov. 1, 2024

(65) Prior Publication Data
US 2025/0061514 A1   Feb. 20, 2025

Related U.S. Application Data

(63) Continuation of application No. 18/435,473, filed on Feb. 7, 2024, now Pat. No. 12,165,206, which is a continuation of application No. 18/119,001, filed on Mar. 8, 2023, now Pat. No. 11,935,122, which is a continuation of application No. 17/948,575, filed on Sep. 20, 2022, now Pat. No. 11,631,137, which is a continuation of application No. 17/695,315, filed on Mar. 15, 2022, now Pat. No. 11,488,248, which is a continuation of application No. 17/487,084, filed on Sep. 28, 2021, now Pat. No. 11,315,184, which is a continuation of application No. 17/225,575, filed on Apr. 8, 2021, now Pat. No. 11,170,443, which is a (Continued)

(51) Int. Cl.
*G06F 13/00* (2006.01)
*G06Q 40/04* (2012.01)

(52) U.S. Cl.
CPC .................................. *G06Q 40/04* (2013.01)

(58) Field of Classification Search
CPC . G06Q 40/04; H04L 12/2467; H04L 12/2634; H04L 43/08
USPC ........................ 709/204–207, 236, 246, 203; 715/751–759; 434/350, 351
See application file for complete search history.

(56) References Cited

U.S. PATENT DOCUMENTS

| | | |
|---|---|---|
| 7,228,331 B2 | 6/2007 | Wang |
| 7,328,250 B2 | 2/2008 | Wang |

(Continued)

OTHER PUBLICATIONS

Singapore Office Action dated May 13, 2015 from corresponding Singapore Application No. 2012072088.

*Primary Examiner* — Kenneth R Coulter
(74) *Attorney, Agent, or Firm* — DLA Piper LLP (US)

(57) ABSTRACT

Systems for and methods of evaluating messaging, comprising, receiving, via at least one server device, one or more messages, and said at least one server device processing at least one of the one or more messages by grading content included in said at least one message, applying a weighting factor to said at least one message according to said grading, thereby determining a weighted message count for said at least one message, aggregating the weighted message count for said at least one message, and initiating an action if the aggregated weighted message count meets or exceeds a predetermined count threshold.

17 Claims, 2 Drawing Sheets

Related U.S. Application Data continuation of application No. 16/715,424, filed on Dec. 16, 2019, now Pat. No. 10,997,658, which is a continuation of application No. 16/164,462, filed on Oct. 18, 2018, now Pat. No. 10,600,122, which is a continuation of application No. 16/026,579, filed on Jul. 3, 2018, now Pat. No. 10,262,369, which is a continuation of application No. 13/624,163, filed on Sep. 21, 2012, now Pat. No. 10,037,569.

(60) Provisional application No. 61/549,774, filed on Oct. 21, 2011.

(56) References Cited

U.S. PATENT DOCUMENTS

| | | |
|---|---|---|
| 7,533,414 B1 | 5/2009 | Reed et al. |
| 7,624,154 B2 | 11/2009 | Wang |
| 7,633,969 B2 | 12/2009 | Caugherty et al. |
| 8,023,974 B1 | 9/2011 | Diao et al. |
| 8,745,217 B2 | 6/2014 | Penumaka et al. |
| 8,819,236 B2 | 8/2014 | Gkantsidis et al. |
| 9,215,212 B2 | 12/2015 | Reddy et al. |
| 9,367,878 B2 | 6/2016 | Rao |
| 10,037,569 B2 | 7/2018 | Wassersug et al. |
| 10,262,369 B2 | 4/2019 | Wassersug et al. |
| 10,600,122 B2 | 3/2020 | Wassersug et al. |
| 10,997,658 B2 | 5/2021 | Wassersug et al. |
| 11,170,443 B2 | 11/2021 | Wassersug et al. |
| 11,315,184 B2 | 4/2022 | Wassersug et al. |
| 11,488,248 B2 | 11/2022 | Wassersug et al. |
| 11,631,137 B2 | 4/2023 | Wassersug et al. |
| 11,935,122 B2 | 3/2024 | Wassersug et al. |
| 12,165,206 B2 * | 12/2024 | Wassersug ............ G06Q 40/04 |
| 2004/0199585 A1 | 10/2004 | Wang |
| 2006/0031507 A1 | 2/2006 | Wang |
| 2006/0067503 A1 | 3/2006 | Caugherty et al. |
| 2006/0168032 A1 | 7/2006 | Cai et al. |
| 2008/0040439 A1 | 2/2008 | Wang |
| 2010/0325588 A1 | 12/2010 | Reddy et al. |
| 2012/0158858 A1 | 6/2012 | Gkantsidis et al. |
| 2013/0191455 A1 | 7/2013 | Penumaka |
| 2013/0282835 A1 | 10/2013 | Bates et al. |
| 2013/0282841 A1 | 10/2013 | Bates et al. |
| 2014/0074856 A1 | 3/2014 | Rao |
| 2016/0197868 A1 | 7/2016 | Morin et al. |

* cited by examiner

SYSTEMS AND METHODS TO IMPLEMENT AN EXCHANGE MESSAGING POLICY

FIELD

The present disclosure relates generally to messaging, and more particularly to evaluating message content for purposes of discouraging inefficient and excessive messaging, while at the same time encouraging receipt and submission of preferred and desired message content.

BACKGROUND

In the business of financial exchange trading, messages are often used by participants to communicate with an exchange trading system ("ETS") for purposes of trading in financial instruments. Indeed, participants may use messages to submit bids (to purchase) and/or offers (to sell) financial instruments to an exchange trading system. Generally speaking, as the number of bids and offers received at an exchange trading system increases, market liquidity is maintained or increases. Thus, in this respect, using messages to submit bids/offers to an exchange trading system provides a fast and effective means of maintaining (and even increasing) market liquidity.

There is, however, a caveat to the foregoing. If, for example, an exchange trading system is flooded with bids or offers that are excessively high or low, market prices may be improperly (and sometimes, intentionally) shifted. Using messages to submit such bids or offers may serve to exacerbate the improper price shifting. In addition, inefficient and excessive messaging can slow the performance of the exchange trading systems, and increase bandwidth and other operation requirements for participants.

Accordingly, there is a need for a mechanism that encourages the continued use of messages to maintain and enhance market liquidity, while at the same time discouraging inefficient and excessive messaging without compromising market liquidity.

SUMMARY

Disclosed herein are systems for and methods of evaluating messaging, comprising, receiving, via at least one server device, one or more messages, and said at least one server device processing at least one of the one or more messages by grading content included in said at least one message, applying a weighting factor to said at least one message according to said grading, thereby determining a weighted message count for said at least one message, aggregating the weighted message count for said at least one message, and initiating an action if the aggregated weighted message count meets or exceeds a predetermined count threshold. Such action may include, for example, one or more of: assessing a financial penalty, increasing a messaging cost, suspending messaging privileges, generating a report that includes a summary of said weighted message count, and generating and transmitting a notice.

In an exemplary embodiment, the processing steps summarized above may be only if a total number of messages received meets or exceeds a predetermined message threshold. In another exemplary embodiment, the systems and methods described herein may also include categorizing one or more messages (received at a server device), and performing the processing steps on only those messages pertaining to categories having received over a predetermined number of messages.

In yet another exemplary embodiment, the grading of at least one message may result in a weighting factor of zero, thereby resulting in a weighted message count of zero for said at least one message. Such grading may include extracting a portion of the message content from the at least one message, comparing said portion to a predetermined metric, and assigning a grading value based on said comparison, wherein said grading value is used to determine said weighting factor. Optionally, this comparison feature may include determining a proximity between the content portion and the predetermined metric, and the grading value may be based on the proximity.

In still another exemplary embodiment, the systems and methods described herein may further comprise calculating a divisor representative of a quality of one or more messages, and dividing the aggregated weighted message count by said divisor to determine a ratio, such that an action may be initiated if the ratio meets or exceeds a predetermined ratio threshold.

Optionally, the at least one server device noted above may comprise a part of an exchange trading system, such that messages received by the server device may include content relating to exchange trading activities, and such messages may be received from one or more trading computer terminals in communication with the at least one server device. These trading terminals may include, without limit, a personal computer (PC), mobile communication device, smart phone, server, personal device assistant (PDA), kiosk, automatic teller machine (ATM), wireless fidelity (WiFi) access point, router, database device, multi-media device, a gaming device, and any other mobile or stationary computing and/or communication device/apparatus.

Content relating to trading activities may include, without limit, market order data, bid data, offer data, order revision data, hold order data, cancel and replace order data, trade consummation data, cancel order data, etc. The grading of such content may comprise comparing a portion of the message content to a predetermined metric that comprises at least one of a live market price and a predetermined numeric scale. In addition, grading such content may optionally comprise determining a proximity between price data (included in one or more messages) and market prices.

As yet another option, content of messages relating to exchange activities may be categorized by commodities market. Then, only those messages pertaining to categories having received over a predetermined number of messages may be processed as summarized above.

In another exemplary embodiment, the systems and methods described herein may comprise calculating a total number of executed lots resulting from one or more messages received by the at least one server device, and dividing the aggregated weighted message count by the total number of executed lots to determine a ratio, wherein an action is initiated if the ratio meets or exceeds a predetermined ratio threshold.

In yet another exemplary embodiment, the systems and methods described herein may comprise calculating a total number of executed trades resulting from one or more messages, and dividing the aggregated weighted message count by said total number of executed trades to determine a ratio, wherein an action is initiated if the ratio meets or exceeds a predetermined ratio threshold.

BRIEF DESCRIPTION OF THE DRAWINGS

For a better understanding of the embodiments described in this application, reference should be made to the Descrip

DETAILED DESCRIPTION

Reference will now be made in detail to exemplary embodiments, examples of which are illustrated in the accompanying drawings. In the following detailed description, numerous specific details are set forth in order to provide a sufficient understanding of the subject matter presented herein. But it will be apparent to one of ordinary skill in the art that the subject matter may be practiced without these specific details. Moreover, the particular embodiments described herein are provided by way of example and should not be used to limit the scope of the invention to these particular embodiments. In other instances, well-known data structures, timing protocols, software operations, procedures, and components have not been described in detail so as not to unnecessarily obscure aspects of the embodiments described herein.

The embodiments described herein may be used to accomplish many things including, for example, to encourage messaging that maintains and increases market liquidity, all while discouraging inefficient and excessive messaging. In addition, the embodiments described herein provide a mechanism for monitoring and reporting on market participants' trading activities, and for ensuring that market participants operate within reasonable messaging thresholds. The embodiments described herein also provide a mechanism for identifying messages that add or enhance market liquidity, and for initiating certain actions if a market participant submits too many messages that detract from or fail to enhance market liquidity.

Figure 1:
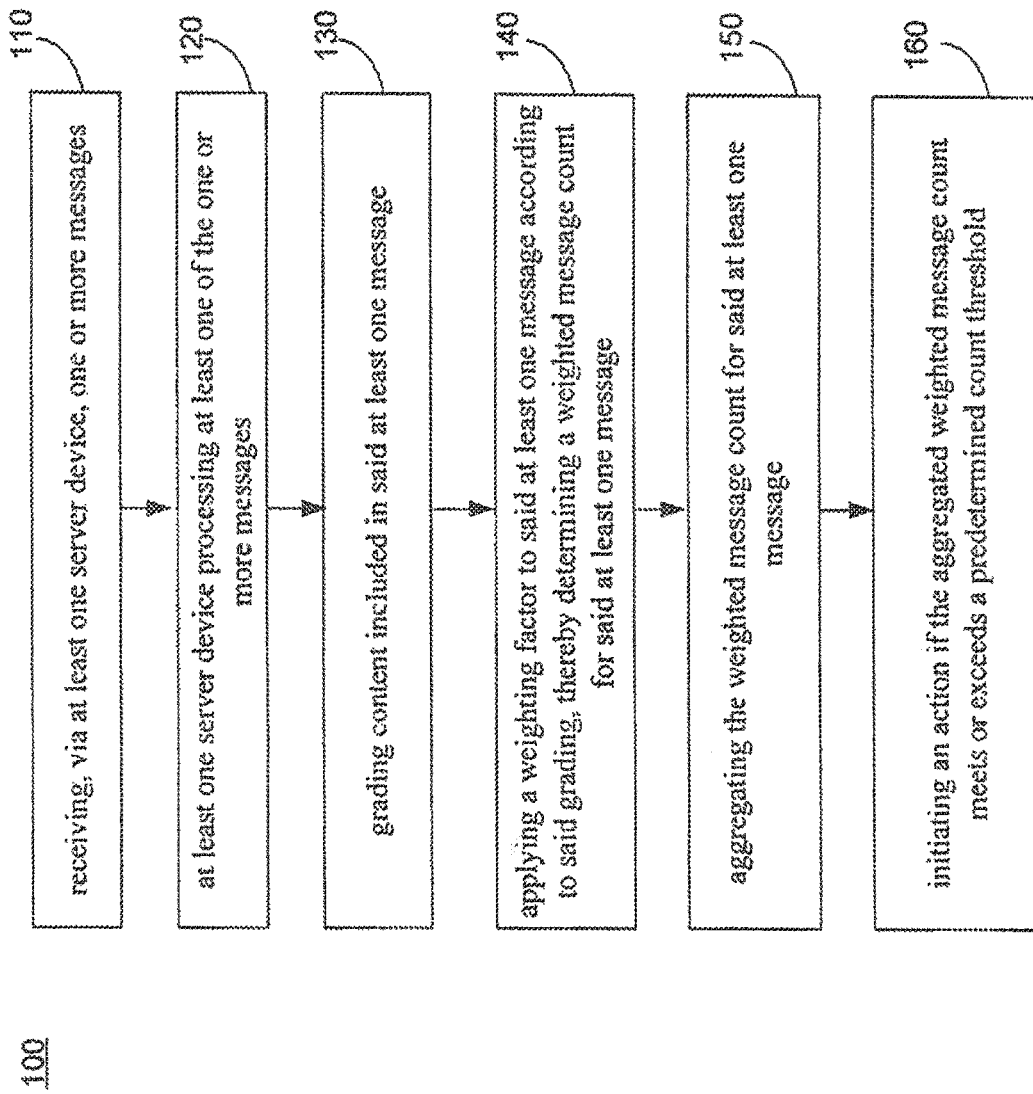
- FIG. 1 depicts a flow chart of an exemplary method of evaluating messaging.

Turning now to FIG. 1, a block diagram 100 showing an exemplary method of evaluating messages according to this disclosure is shown. As an initial step, the exemplary method 100 comprises receiving, via at least one server device, one or more messages 110. As further discussed below, this at least one server device may include one or more stand-alone servers, or it may be a part of a larger system, such as an exchange trading system. In such an embodiment, the at least one server device may receive messages that include content relating trading activities, such as market order data, bid data, offer data, order revision data, hold order data, cancel and replace order data, trade consummation data, cancel order data, or any other type of data and information relating to trading activities. Such messages may be received, for example, from one or more trading terminals that are in communication with the at least one server device via, for example, a wired or wireless communications network. Examples of such trading terminals include, without limit, a personal computer (PC), a mobile communication device, a smart phone, another server, a personal device assistant (PDA), a kiosk, an automatic teller machine (ATM), a wireless fidelity (Wi-Fi) access point, a router, a database device, a multi-media device, a gaming device, and/or any other mobile or stationary computing and/or communication device.

Returning now to FIG. 1, once the one or more messages are received, the at least one server device processes at least one of the received messages 120. This processing may limited to occurring only after a predetermined number of messages is received (i.e., after the total number of messages received meets or exceeds a predetermined message threshold). In another embodiment, the received messages may first be categorized, in which case the processing may be limited to only those messages pertaining to particular categories having received over a predetermined number of messages. For example, if the messages received relate to exchange trading activities, the messages may first be categorized by commodities market, and the processing may be limited to only those commodities market categories having received over a predetermined number of messages.

The processing 120 referenced above may include grading the content included in the at least one message 130. In one embodiment, grading may include the process of extracting a portion of a message's content, comparing that portion to a predetermined metric, and assigning a grading value based on the comparison. This grading value may then be used to determine a weighting factor (discussed below). Optionally, this comparison may include determining a proximity between the extracted content portion and the predetermined metric, in which case the grading value would be based on said proximity. As an illustrative example, if the messages received relate to exchange trading activities, the grading step 130 may include extracting price data from a message, comparing (e.g., determining a proximity between) the extracted price data and a predetermined market metric (e.g., a live market price, a historic market price, a predetermined numeric scale, etc.), and assigning a grading value based on the proximity of the extracted price data and the market metric.

Once a message's content is graded 130, a weighting factor is applied to that message 140 according to the grading, so as to provide a weighted message count for that message. As further discussed below, this weighted message count is used to determine whether a predetermined messaging threshold has been met or exceed. Thus, for example, if the content of a particular message receives a favorable grading, the message will receive a favorable weighting. Similarly, if the message content receives a poor grading, the weighting factor applied to the message will reflect the poor grading As an illustrative example, it is assumed that the messages received 110 by the at least one server relate to exchange trading activities, and that the messages are graded 130 according to a proximity between price data extracted from the messages and live market prices. In such a scenario, messages that include competitive bid or offer price data are encouraged, as such price data adds to market liquidity. As a result, these messages will receive a favorable grading and a favorable weighting factor. In one embodiment, the most favorable weighting factor may be zero, such that when applied to a message, the resulting message count for that message is zero. This means that that message will not count towards a participant's messaging limit or threshold. Messages that include a 'best' bid or offer price, for example, may receive weighting factors of zero.

Conversely, messages that include non-competitive bid or price data will receive a poor grading, resulting in a heavily weighted factor being applied to such messages. As will be readily understood, heavily weighted messages accelerate the speed at which a message count reaches a messaging threshold. Thus, for example, if a particular participant continually submits messages having non-competitive bids or offers (e.g., bids or offers that are excessively higher or lower than current market prices), that participant will reach his messaging threshold much faster than a participant who consistently submits messages having competitive price data.

As the content of each message is graded 130 and weighted 140, the weighted message count for the received messages is aggregated 150 and compared to a predetermined messaging threshold. Notably, this aggregating may occur continually, at predetermined time intervals (e.g., every hour), or periodically after a predetermined number of messages have been received (e.g., every 50 messages received).

If the aggregated message count meets or exceeds the threshold, one or more actions may be initiated 160. These actions may include, without limit, assessing a financial penalty, increasing a messaging cost, and/or suspending messaging privileges of the participant (or any designated entity) that exceeded the messaging threshold. In addition, the at least one server device may optionally generate a report that includes a summary of the weighted message count, and it may generate and transmit a notice (e.g., alerting that the messaging threshold has been met or exceeded) to any desired entity.

In one exemplary embodiment, prior to initiating any action 160 as summarized above, the at least one server may first calculate a divisor representative of a quality of the one or more messages received 110, and then divide the aggregated weighted message count by the divisor to determine a ratio. This ratio may then be used to determine whether to initiate any action 160 (e.g., the action is initiated if the ratio meets or exceeds a predetermined ratio threshold).

As an illustrative example, a divisor representative of a quality of a message may include a total number of executed lots resulting from a message, a total number of executed trades resulting from a message, or any other metric indicative of the quality of a particular message. Thus, the total number of executed lots (or executed trades) resulting from a message may be calculated and then used to divide the aggregated weighted message count to yield a ratio. This ratio may then be compared to a predetermined ratio threshold to determine whether to initiate any of the actions discussed above. If the ratio meets or exceeds the ratio threshold, an action may be initiated 160.

The exemplary methods and embodiments discussed above may be carried out by one or more modules, components or function units of one or more computers, networks, servers and/or calculation devices. In the present description, the terms component, module, and functional unit, may refer to any type of logical or functional process or blocks that may be implemented in a variety of ways. For example, the functions of various blocks can be combined with one another into any other number of modules. Each module can be implemented as a software program stored on a tangible memory (e.g., random access memory, read only memory, CD-ROM memory, hard disk drive) to be read by a central processing unit to implement the functions of the present invention. Or, the modules can comprise programming instructions transmitted to a general purpose computer, server or to graphics processing hardware via a transmission carrier wave. Also, the modules can be implemented as hardware logic circuitry implementing the functions described herein.

Figure 2:
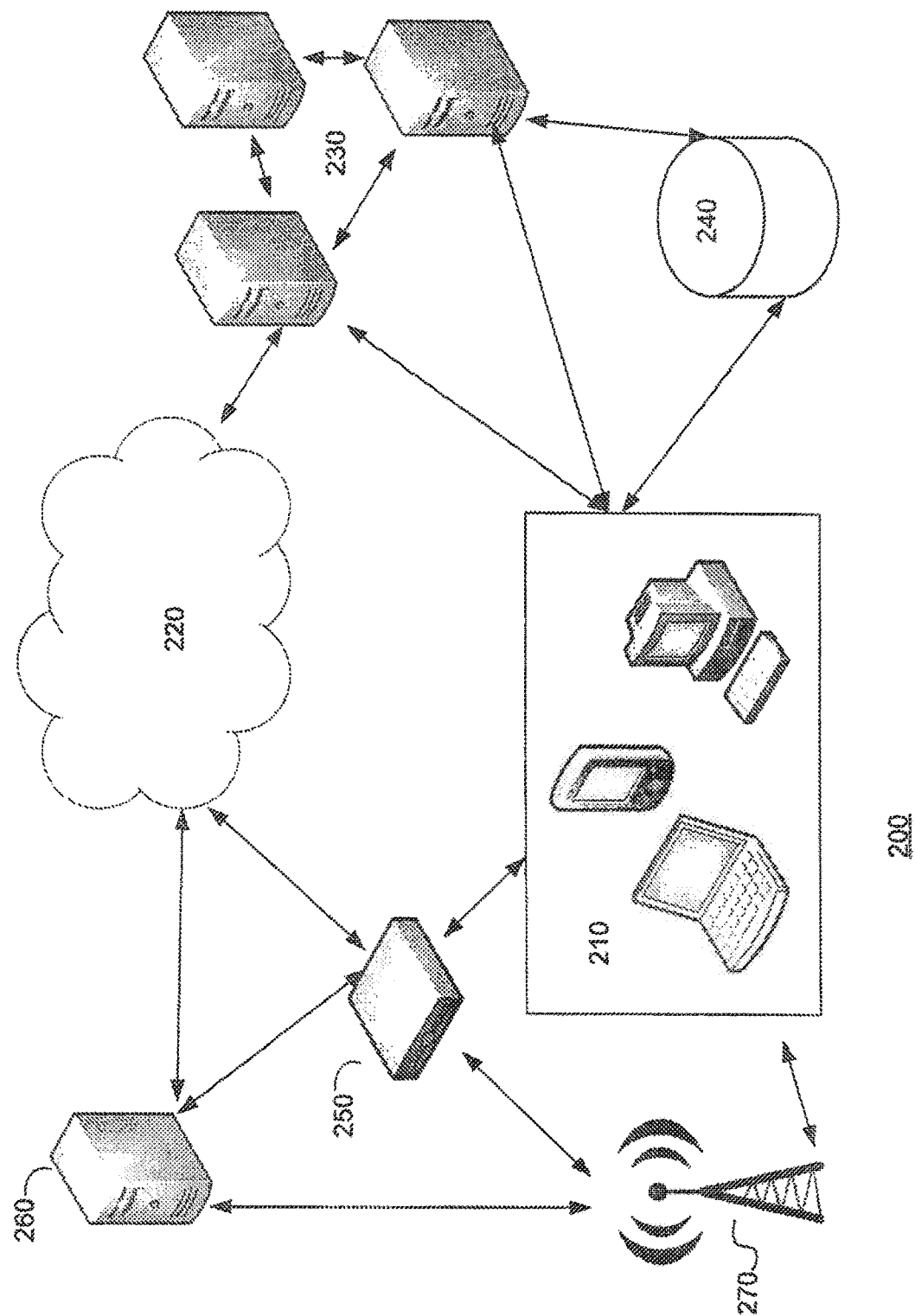
FIG. 2 depicts an exemplary system for evaluating messaging.

Turning now to FIG. 2, an exemplary system 200 for evaluating messaging in accordance with this disclosure, including implementing all of the various methods discussed above with respect to FIG. 1, is shown. The exemplary system 200 could operate in any kind of local area or wide area network that employs terminals or user interface platforms 210, both wireless and hard wired. The terminals or user interface platforms 210 may include (without limit) one or more trading terminals, personal computers (PCs), mobile communication devices, smart phones, servers, personal device assistants (PDAs), kiosks, automatic teller machines (ATMs), wireless fidelity (Wi-Fi) access points, routers, database devices, multi-media devices, gaming devices or any other wired or wireless computing and/or communications device. Such terminals 210 may be connected to the internet 220 or other wide area network (WAN) or local area network (LAN) via various server groups 230, databases 240, routers 250, stand alone servers 260 or any combination thereof. The system 200 (or portions thereof) could be hard wired or wireless. In the case of a wireless system, the terminals 210 could communicate and be connected to the internet 220 via, for example, a wireless transmitter 270 and/or one or more routers 250 or servers 260. The system 200 could run on a local closed network within a defined boundary, or on an open wide area network allowing more users to remotely log in.

Additionally, as an example, any number of protocols for using the system 200 could help protect it by secure means. These could entail anything, such as firewalls, password protection, encryption, login credentials, biometric credentials, or any other security means for user access and data security.

In one embodiment, a single server 260 or a group of servers 230 may be programmed and configured to receive messages. Optionally, if the server 230/260 is part of a larger exchange trading system, the messages received may include content relating trading activities, such as market order data, bid data, offer data, order revision data, hold order data, cancel and replace order data, trade consummation data, cancel order data, or any other type of data and information relating to trading activities. Such messages may be received, for example, from the one or more trading terminals 210 that are in communication with the server device 230/260 via, for example, a wired or wireless communications network (e.g., 220).

Upon receiving messages, the server device 230/260 is configured to process at least one of the received messages. This processing may limited to occurring only after a predetermined number of messages is received. Optionally, the server device 230/260 may be configured to categorize received messages, and process only those messages pertaining to one or more particular categories having received over a predetermined number of messages. For example, if the messages received relate to exchange trading activities, the messages may first be categorized by commodities market, and the processing may be limited to only those commodities market categories having received over a predetermined number of messages.

The processing referenced above may include grading the content included in the messages. Such grading may include extracting a portion of a message's content, comparing that portion to a predetermined metric, and assigning a grading value based on the comparison. This grading value may then be used to determine a weighting factor that is to be applied to each message. In an exemplary embodiment, the server device 230/260 may be configured to determine a proximity between price data extracted from a message and live market prices, and determine a grading value based on said proximity.

Once a message's content is graded, the server device 230/260 is further configured to apply a weighting factor to that message according to the grading, so as to provide a weighted message count for that message. As the content of each message is graded and weighted, the server device 230/260 is further configured to aggregate the weighted message count of the received messages, and compare the aggregated message count to a predetermined messaging threshold. Notably, this aggregating may occur continually, at predetermined time intervals (e.g., every hour), or periodically after a predetermined number of messages has been received (e.g., every 50 messages received).

If the server device 230/260 determines that an aggregated message count meets or exceeds the threshold, the server device 230/260 may initiate one or more actions. These actions may include, without limit, assessing a financial penalty, increasing a messaging cost, and/or suspending messaging privileges of the participant (or any designated entity) that exceeded the messaging threshold. In addition, the server device 230/260 may optionally generate and/or transmit a report that includes a summary of the weighted message count, and it may generate and/or transmit a notice (e.g., alerting that the messaging threshold has been met or exceeded) to any desired entity.

In one exemplary embodiment, the server device 230/260 may be further configured to calculate a divisor representative of a quality of one or more received messages, and then divide the aggregated weighted message count by the divisor to determine a ratio. This ratio may then be used by the server device 230/260 to determine whether to initiate any action discussed above. To illustrate, a divisor representative of a quality of a message may include a total number of executed lots resulting from a message, a total number of executed trades resulting from a message, or any other metric indicative of the quality of a particular message. Thus, the server device 230/260 may be configured to calculate a total number of executed lots (or executed trades) resulting from a message and then used to divide the aggregated weighted message count to yield a ratio. This ratio may then be compared to a predetermined ratio threshold to determine whether to initiate any of the actions discussed above. If the ratio meets or exceeds the ratio threshold, the server device 230/260 may initiate one or more actions.

In an illustrative embodiment, the methods and systems discussed above may be implemented to control and enhance the operations of an exchange trading system ("ETS"). For purposes of this illustration, it is assumed that the ETS provides a platform for engaging in financial trading activities, including in the exchange of financial instruments such as contracts. It is also assumed that messages are submitted to the ETS to initiate such financial trading activities. For example, a participant may submit orders, bids, offers, order revisions, hold orders, cancel and replace orders, trade consummation data, an cancel order data, etc. to the ETS in connection with contracts traded thereon.

In order to limit the amount of messages received and processed by the ETS, while at the same time enhancing liquidity, the contracts exchanged via the ETS may be grouped according to certain designated markets, and then messaging thresholds may be imposed according to the different designated markets. For example, the contracts be grouped into designated markets such as natural gas swap contracts, gas oil futures contracts, gas oil spreads, etc., and then assigned a messaging threshold per designated market. Thus, for example, the messaging threshold for natural gas swap contracts may be set to 100,000 messages, while a messaging threshold for gas oil futures contracts may be set to 250,000, etc. This means that any given participant (e.g., a trading firm) is limited to a 100,000 messaging count with respect to natural gas swap contracts, and a 250,000 messaging count with respect to gas oil futures contracts. As further discussed below, having a messaging threshold of say, 100,000 does not necessarily mean that a participant may submit 100,000 messages. To the contrary, each message submitted by a participant may be independently evaluated, and then counted as either a single message, as more than a single message, or even as less than a single message depending on the 'quality' of the message content.

In this exemplary embodiment, a weighting scale may be used to apply a weighting factor to each message depending on its 'quality.' This weighting factor, when applied to each message, will either increase the message count of that particular message to greater than one, maintain it at one, or reduce it to a value of less than one. To illustrate, if 'quality' were based on price (e.g., the proximity between a current market price and a price submitted via a message), a lower quality message (i.e., one having a price that is very distant from a current market price) may be weighted heavily, so as to accelerate the rate at which a participant reaches a messaging threshold. Conversely, high quality messages (i.e., those having prices that are very close or even better than a current market price) may not be weighted at all (or even weighted negatively) which will prolong reaching the messaging threshold. An example priced-based weighting multiplier table is shown below:

TABLE 1

| Price Difference | Price Based Weighting Multiplier | | Description |
| --- | --- | --- | --- |
| From Best Bid or Offer | Outrights | Spreads | |
| None (best bid or offer) | 0 | 0 | If the price is the best bid or offer, it will not be counted |
| At market bid or offer | 0 | 0 | If the price equals the best bid or offer it will not be counted. |
| 1 tick off current market price | 0.5 | 0.25 | If the price is within one minimum price fluctuation (tick) of the best bid or best offer it will count as one half of a message in an outright market and one quarter of a message in a spread market. |
| 2 ticks off current market price | 1.0 | 0.5 | If the price is within two (2) ticks of the best bid or best offer it will count as one (1) message in an outright market and one half (.5) message in a spread market. |
| 3, 4 or 5 ticks off current market price | 2.0 | 1.0 | If the price is three (3), four (4) or five (5) ticks from the best bid or best offer it will count as two (2) messages in an outright market and one (1) message in a spread market. |
| More than 5 ticks off current market price | 3.0 | 2.0 | If the price is more than five (5) ticks from the best bid or best offer it will count as three (3) messages in an outright market and two messages (2) in a spread market. |

As indicated in Table 1 above, messages submitting best bid or offer prices, or prices that equal a current market price, are given a zero weighting multiplier. This, in essence, results in a zero message count, which means that the message is not counted (towards the messaging threshold). This will encourage participants to continue to submit competitive bid and offer prices, thereby increasing market liquidity. Messages that include bids or offers that are far off of current market prices, however, are penalized and weighted heavily to count as more than one message, thereby increase the rate at which the messaging threshold is met. Weighted messages may then be aggregated, and penalties or other actions may be initiated if the aggregated message count for a particular participant meets or exceeds the predetermined messaging threshold.

In conjunction with weighting messages as discussed above, a weighted volume ratio ("WVR") may be used to determine whether to take action against those participants that meet or exceed a predetermined messaging threshold. This WVR may be defined as the total number of messages submitted by a particular participant for a particular designated contract market, multiplied by a price-based weighting scale (e.g., as defined in Table 1), and then divided by the total number of lots or trades executed as a result of the messages submitted by that participant. The result is a figure for weighted messages per executed contract. Thus, a WVR of 100:1 means that a particular participant had to submit the equivalent of 100 messages to achieve one executed trade or lot.

Like the messaging threshold discussed above, a WVR limit may be set as desired and as appropriate for the particular implementation (e.g., a WVR limit may be set to 100:1, 500:1, or any other ratio). Participants who meet or exceed the predetermined WVR limit for a designated contract market on a particular trading day or over any predetermined period of time (e.g., over seven days in a calendar month) may receive some action initiated by the ETS. As noted above, these actions may include (without limit) an electronic notification, assessment of a financial penalty, an increase in messaging cost, suspension of messaging privileges, generation of a report, etc.

Notably, implementation of this WVR is not required, and it does not necessarily depend on reaching the predetermined messaging threshold. Indeed, it is possible for a participant to exceed the WVR ratio limit without having reach the aggregated messaging threshold.

As disclosed herein, embodiments and features of the invention may be implemented through computer-hardware, software and/or firmware. For example, the systems and methods disclosed herein may be embodied in various forms including, for example, a data processor, such as a computer or server that also includes a database, digital electronic circuitry, firmware, software, or in combinations of them. Further, while some of the disclosed implementations describe components such as software, systems and methods consistent with the present disclosure may be implemented with any combination of hardware, software and/or firmware. Moreover, the above-noted features and other aspects and principles described herein may be implemented in various environments. Such environments and related applications may be specially constructed for performing the various processes and operations described herein according to industry-specific implementations (e.g., exchange trading environment) or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings herein, or it may be more convenient to construct a specialized apparatus or system to perform the required methods and techniques.

The innovations described herein may be implemented via one or more components, systems, servers, appliances, other subcomponents, or distributed between such elements. When implemented as a system, such system may comprise, inter alia, components such as software modules, general-purpose CPU, RAM, etc. found in general-purpose computers, and/or FPGAs and/or ASICs found in more specialized computing devices. In implementations where the innovations reside on a server, such a server may include or involve components such as CPU, RAM, etc., such as those found in general-purpose computers.

Additionally, the innovations described herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the innovations herein may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

Innovative software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules or other data embodying the functionality herein. Further, communication media may include wired media such as a wired network or direct-wired connection, and wireless media such as acoustic, RF, infrared and other wireless media. Combinations of the any of the above are also included within the scope of computer readable media.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, and so on).

Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

The invention claimed is:

1. A system comprising:
one or more processors configured to execute instructions stored in a non-transitory memory, the one or more processors configured to:
receive one or more electronic messages from one or more client terminals over at least one network, the one or more electronic messages including exchange activity data;
determine whether a total number of the one or more electronic messages meets or exceeds a predetermined message threshold;
when the total number of the one or more electronic messages meets or exceeds the predetermined message threshold:
grade content in the one or more electronic messages by comparing at least a portion of the exchange activity data in the one or more electronic messages to a predetermined metric; and
initiate an action in response to the grading of said portion of the exchange activity data in the one or more electronic messages, the action affecting future messaging privileges of the one or more client terminals associated with any of the one or more electronic messages for which the predetermined metric is met or exceeded; and
otherwise, bypass said grading of the content in the one or more electronic messages and initiation of any action associated with the one or more electronic messages.

2. The system of claim 1, wherein the action comprises one or more of assessing a financial penalty, increasing a messaging cost, suspending of the future messaging privileges, generating and transmitting a report relating to the grading, and generating and transmitting a notice.

3. The system of claim 1, wherein the one or more processors are further configured to categorize the one or more electronic messages by one or more predetermined categories, based on the exchange activity data.

4. The system of claim 3, wherein the one or more processors are further configured to grade only a portion of the one or more electronic messages pertaining to the one or more predetermined categories that meets or exceeds the predetermined message threshold.

5. The system of claim 3, wherein the one or more predetermined categories include one or more commodities markets.

6. The system of claim 1, wherein, as part of the grading, the one or more processors are further configured to:
apply a weighting factor to the one or more electronic messages to determine a weighted message count for the one or more electronic messages; and
aggregate the weighted message count for the one or more client terminals.

7. The system of claim 6, wherein the action is initiated when the aggregated weighted message count meets or exceeds a predetermined count threshold.

8. The system of claim 6, wherein when the grading results in the weighting factor being zero, the weighted message count comprises zero.

9. The system of claim 6, wherein, as part of the grading, the one or more processors are further configured to assign a grading value to the one or more electronic messages based on the comparing, wherein the grading value is used to determine the weighting factor.

10. The system of claim 9, wherein the comparing of the at least the portion of the exchange activity data to the predetermined metric comprises determining a proximity between the at least the portion of the exchange activity data and the predetermined metric, and wherein the grading value is based on the proximity.

11. The system of claim 6, wherein the one or more processors are further configured to:
   calculate a divisor representative of a quality of the one or more electronic messages;
   divide the aggregated weighted message count by the divisor to determine a ratio; and
   initiate the action when the ratio meets or exceeds a predetermined ratio threshold.

12. The system of claim 1, wherein the exchange activity data comprise one or more of market order data, bid data, offer data, order revision data, hold order data, cancel and replace order data, trade consummation data, and cancel order data.

13. The system of claim 1, wherein the at least the portion of the exchange activity data comprises price data and the predetermined metric comprises one or more of a live market price and a predetermined numeric scale.

14. The system of claim 1, wherein, as part of the grading, the one or more processors are further configured to:
   calculate a total number of executed lots resulting from the one or more electronic messages;
   divide an aggregated weighted message count by the total number of executed lots to determine a ratio; and
   initiate the action when the ratio meets or exceeds a predetermined ratio threshold.

15. The system of claim 1, wherein, as part of the grading, the one or more processors are further configured to:
   calculate a total number of executed trades resulting from the one or more electronic messages;
   divide an aggregated weighted message count by the total number of executed trades to determine a ratio; and
   initiate the action if the ratio meets or exceeds a predetermined ratio threshold.

16. The system of claim 1, wherein, in response to the grading, the one or more processors are further configured to maintain messaging from the one or more client terminals within the predetermined metric.

17. The system of claim 1, wherein the one or more client terminals comprise one or more of a personal computer (PC), a mobile communication device, a smart phone, a computer server, a personal device assistant (PDA), a kiosk, an automatic teller machine (ATM), a wireless fidelity (Wi-Fi) access point, a router, a database device, a multimedia device, and a gaming device.

* * * * *